US010886993B2

United States Patent
Miao

(10) Patent No.: US 10,886,993 B2
(45) Date of Patent: Jan. 5, 2021

(54) INTER-CELL BEAM MANAGEMENT

(71) Applicant: Apple Inc., Cupertino, CA (US)

(72) Inventor: Honglei Miao, Munich (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/359,138

(22) Filed: Mar. 20, 2019

(65) Prior Publication Data

US 2019/0222286 A1 Jul. 18, 2019

Related U.S. Application Data

(60) Provisional application No. 62/646,595, filed on Mar. 22, 2018.

(51) Int. Cl.
| | |
|---|---|
| *H04B 7/06* | (2006.01) |
| *H04L 27/26* | (2006.01) |
| *H04W 76/27* | (2018.01) |
| *H04L 5/00* | (2006.01) |

(52) U.S. Cl.
CPC .......... *H04B 7/0639* (2013.01); *H04B 7/066* (2013.01); *H04B 7/0617* (2013.01); *H04B 7/0626* (2013.01); *H04L 5/0048* (2013.01); *H04L 5/0051* (2013.01); *H04L 5/0057* (2013.01); *H04L 5/0094* (2013.01); *H04L 27/2611* (2013.01); *H04L 27/2675* (2013.01); *H04L 27/2695* (2013.01); *H04W 76/27* (2018.02); *H04L 5/0007* (2013.01)

(58) Field of Classification Search
CPC .. H04B 7/0639; H04B 7/0617; H04B 7/0626; H04B 7/066; H04W 76/27; H04L 5/0048; H04L 5/0051; H04L 5/0057; H04L 5/0094; H04L 5/0007; H04L 27/2611; H04L 27/2675; H04L 27/2695
USPC ........................................................ 375/262
See application file for complete search history.

(56) References Cited

U.S. PATENT DOCUMENTS

| 10,064,079 B2* | 8/2018 | Davydov | .......... H04W 72/0473 |
| 2020/0086778 A1* | 3/2020 | Jeon | ........................ G06N 3/08 |

OTHER PUBLICATIONS

"3rd Generation Partnership Project; Technical Specification Group Radio Access Network; NR; Physical layer procedures for data (Release 15)." 3GPP TS 38.214 V15.4.0 (Dec. 2018). 102 pages.

(Continued)

*Primary Examiner* — Kevin M Burd
(74) *Attorney, Agent, or Firm* — Eschweiler & Potashnik, LLC

(57) ABSTRACT

Techniques discussed herein can facilitate L1 (Layer 1) inter-cell beam management. Various embodiments can employ at least one of a first set of techniques or a second set of techniques for L1 inter-cell beam management. The first set of techniques can employ SSB (Synchronization Signal Block)-based L1 inter-cell beam management. The second set of techniques can employ Sync (Synchronization)-CSI (Channel State Information)-RS (Reference Signal)-based L1 inter-cell beam management. Various options of the second set of techniques can employ CSI-RS with CDM (Code Division Multiplexing) or without CDM.

12 Claims, 13 Drawing Sheets

(56) References Cited

OTHER PUBLICATIONS

3rd Generation Partnership Project; Technical Specification Group Radio Access Network; NR; Radio Resource Control (RRC) protocol specification (Release 15). 3GPP TS 38.331 V15.4.0 (Dec. 2018). 474 pages.

"Synchronization assistance for CSI-RS based measurements." Agenda Item: 7.1.1.6. Source: Ericsson. 3GPP TSG RAN WG1 Meeting #92. Athens, Greece, Feb. 26-Mar. 2, 2018. R1-1802949. 6 pages.

* cited by examiner

```
CSI-RS-ResourceConfig-Mobility ::=   SEQUENCE {
    -- NO specific values
    csi-rs-MeasurementBW                SEQUENCE {
        csi-rs-measurementBW-size           ENUMERATED { size24, size48, size96, size192,
size268},
        csi-rs-measurement-BW-start         ENUMERATED (ffsTypeAndValue),
        associated-SSB                      ENUMERATED (ffsTypeAndValue),
        qcled-SSB                           BOOLEAN,
        isservingCellNO                     BOOLEAN
    },
    -- subcarrier spacing of CSI-RS. It can take the same values available also for the data
channels and for SSB
    subcarrierSpacing                   SubcarrierSpacing,
    -- List of resources
    csi-rs-ResourceList-Mobility        SEQUENCE (SIZE (1..maxNrofCSI-RS-ResourcesRRM)) OF CSI-RS-
Resource-Mobility
}

CSI-RS-Resource-Mobility            SEQUENCE {
    csi-rs-ResourceId-RRM               CSI-RS-ResourceId-RRM,
    cellId                              PhysicalCellId,
}
```

```
NZP-CSI-RS-Resource ::=       SEQUENCE
{
    nzp-csi-rs-ResourceId         NZP-CSI-RS-ResourceId,
    -- Number of ports (see 38.214, section 5.2.1.3.1)
    nrofPorts                     ENUMERATED (p1,p2,p4,p8,p12,p16,p24,p32),
    -- OFDM symbol location(s) in a slot and subcarrier occupancy in a PRB of the CSI-RS resource
    -- FFS: how to configure periods in different slots for time/frequency tracking (see
    -- 38.214, section 5.2.1.3.1)
    resourceMapping               TYPE_FFS1,
    -- cdm value (1, 2, 4, or 8); cdm patterns (freq only, time and freq, time only) (see 38.214,
    -- section 5.2.1.3.1)
    cdm-value                     ENUMERATED (n1, n2, n4, n8),
    cdm-Pattern                   ENUMERATED (freqOnly, timeAndFreq, timeOnly),
    -- Density of CSI-RS resource measured in RE/port/PRB (see 38.214, section 5.2.1.3.1)
    -- Values 0.5 (dot5), 1 (one) and 3 (three) are allowed for X=1
    -- Values 0.5 (dot5) and 1 (one) are allowed for X=2, 16, 24 and 32.
    -- Value 1 (one) is allowed for X=4, 8, 12
    csi-RS-Density                ENUMERATED (dot5, one, three, spare),
    -- Wideband or partial band CSI-RS (see 38.214, section 5.2.1.3.1)
    csi-RS-FreqBand               TYPE_FFS1,
    -- Power offset of NZP CSI-RS to PDSCH RE. Corresponds to parameter Pc (see 38.214,
    -- section 5.2.1.3.1)
    powerControlOffset            TYPE_FFS1,
    -- Power offset of NZP CSI-RS to SS RE. Corresponds to L1 parameter 'Pc_SS' (see 38.214,
    -- section FFS Section)
    powerControlOffsetSS          FFS_Value              OPTIONAL,
    -- Scrambling ID (see 38.214, section 5.2.1.3.1)
    scramblingID                  TYPE_FFS1,
    -- Periodicity and slot offset
    csi-RS-timeConfig             CHOICE {
        sl5                       INTEGER (0..4),
        sl10                      INTEGER (0..9),
        sl20                      INTEGER (0..19),
        sl40                      INTEGER (0..39),
        sl80                      INTEGER (0..79),
        sl160                     INTEGER (0..159),
        sl320                     INTEGER (0..319),
        sl640                     INTEGER (0..639)
    }
}
```

|         | CSI-RS R#1 No CDM |           |
|---------|-------------------|-----------|
|         | OS#1              | OS#2      |
| PRB#1   | CSI-RS#1          | CSI-RS#5  |
|         | CSI-RS#2          | CSI-RS#6  |
|         | CSI-RS#3          | CSI-RS#7  |
|         | CSI-RS#4          | CSI-RS#8  |
|         | CSI-RS#1          | CSI-RS#5  |
|         | CSI-RS#2          | CSI-RS#6  |
|         | CSI-RS#3          | CSI-RS#7  |
|         | CSI-RS#4          | CSI-RS#8  |
|         | CSI-RS#1          | CSI-RS#5  |
|         | CSI-RS#2          | CSI-RS#6  |
|         | CSI-RS#3          | CSI-RS#7  |
|         | CSI-RS#4          | CSI-RS#8  |
|         | ...               | ...       |
|         | ...               | ...       |
|         | ...               | ...       |
| PRB#11  | CSI-RS#1          | CSI-RS#5  |
|         | CSI-RS#2          | CSI-RS#6  |
|         | CSI-RS#3          | CSI-RS#7  |
|         | CSI-RS#4          | CSI-RS#8  |
|         | CSI-RS#1          | CSI-RS#5  |
|         | CSI-RS#2          | CSI-RS#6  |
|         | CSI-RS#3          | CSI-RS#7  |
|         | CSI-RS#4          | CSI-RS#8  |
|         | CSI-RS#1          | CSI-RS#5  |
|         | CSI-RS#2          | CSI-RS#6  |
|         | CSI-RS#3          | CSI-RS#7  |
|         | CSI-RS#4          | CSI-RS#8  |

FIG. 8

| | CSI-RS R#1 CDM4 (FD2, TD2) | | |
|---|---|---|---|
| | OS#1 | OS#2 | |
| PRB#1 | CSI-RS#1 | | |
| | CSI-RS#2 | | |
| | CSI-RS#3 | | |
| | CSI-RS#1 | | |
| | CSI-RS#2 | | |
| | CSI-RS#3 | | |
| | ... | ... | |
| | ... | ... | |
| | ... | ... | |
| PRB#11 | CSI-RS#1 | | |
| | CSI-RS#2 | | |
| | CSI-RS#3 | | |
| | CSI-RS#1 | | |
| | CSI-RS#2 | | |
| | CSI-RS#3 | | |

FIG. 9

INTER-CELL BEAM MANAGEMENT

REFERENCE TO RELATED APPLICATIONS

This application claims the benefit of U.S. Provisional Patent Application No. 62/646,595 filed Mar. 22, 2018, entitled "INTER-CELL BEAM MANAGEMENT", the contents of which are herein incorporated by reference in their entirety.

FIELD

The present disclosure relates to wireless technology, and more specifically to techniques related to facilitating L1 (Layer 1) inter-cell beam management.

BACKGROUND

Mobile communication has evolved significantly from early voice systems to today's highly sophisticated integrated communication platform. The next generation wireless communication system, 5G (or new radio (NR)) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP (Third Generation Partnership Project) LTE (Long Term Evolution)-Advanced with additional potential new Radio Access Technologies (RATs) to enrich people lives with better, simple and seamless wireless connectivity solutions. NR will enable everything connected by wireless and deliver fast, rich contents and services.

BRIEF DESCRIPTION OF THE DRAWINGS

FIG. 6 is a diagram illustrating RRC (Radio Resource Control) configuration of TRS (Tracking Reference Signal) used for L3 (Layer 3) mobility measurement, in connection with various aspects discussed herein.

FIG. 7 is a diagram illustrating RRC configuration of NZP (Non-Zero Power)-CSI-RS resource for CSI calculation and BM (Beam Management), in connection with various aspects discussed herein.

FIG. 8 is a diagram illustrating an example configuration of Synchronization-CSI-RS sets with no CDM that can be employed for Sync-CSI-RS based L1 inter-cell beam management, according to various aspects discussed herein.

FIG. 9 is a flow diagram illustrating an example configuration of Synchronization-CSI-RS sets with CDM that can be employed for Sync-CSI-RS based L1 inter-cell beam management, according to various aspects discussed herein.

DETAILED DESCRIPTION

Figure 1:
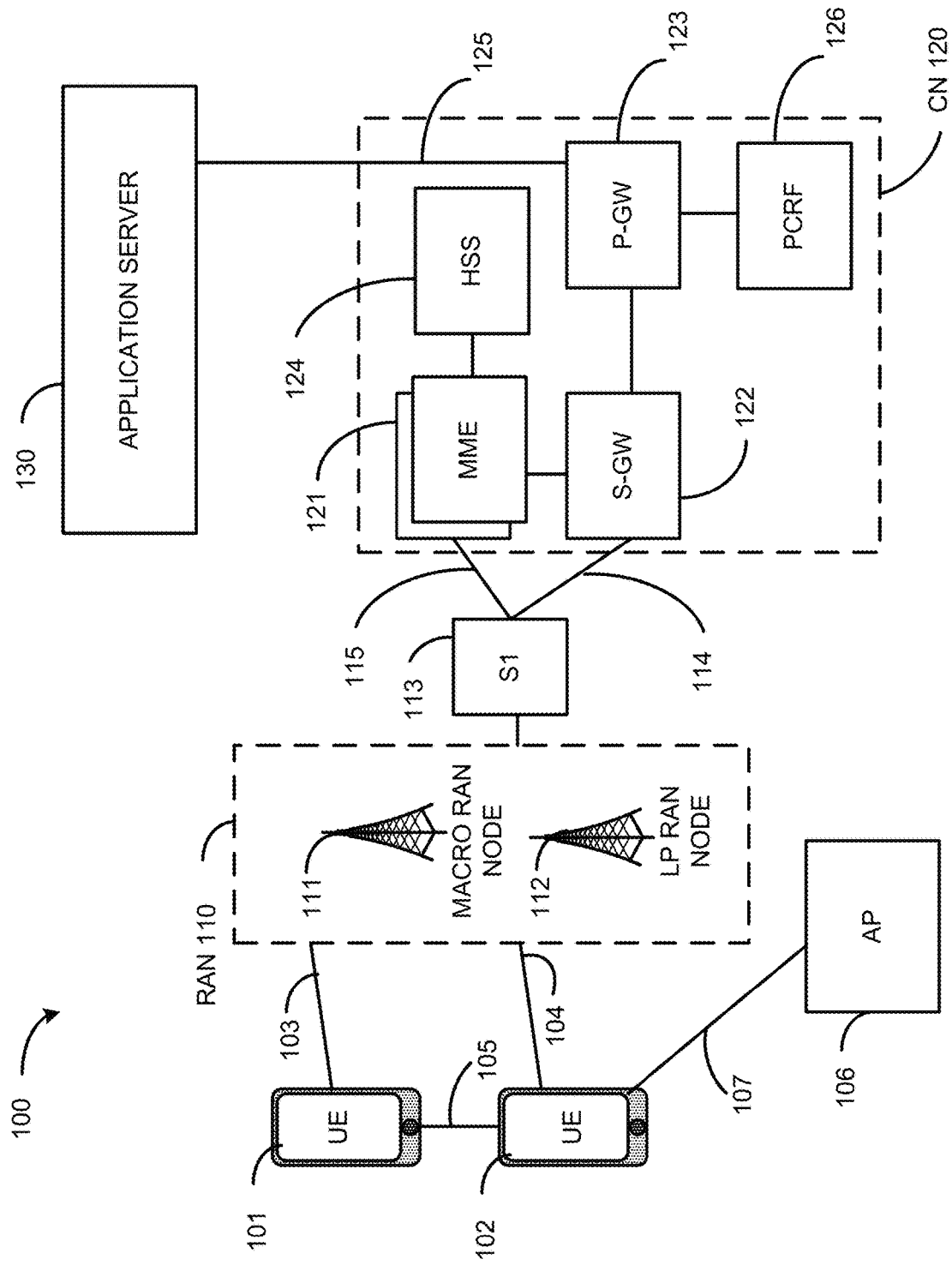
FIG. 1 is a block diagram illustrating an example user equipment (UE) useable in connection with various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct or they may be the same, although in some situations the context may indicate that they are distinct or that they are the same.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software. FIG. 1 illustrates an architecture of a system 100 of a network in accordance with some embodiments. The system 100 is shown to include a user equipment (UE) 101 and a UE 102. The UEs 101 and 102 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 101 and 102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 101 and 102 may be configured to connect, e.g., communicatively couple, with a radio access network (RAN) 110—the RAN 110 may be, for example, an Evolved Universal Mobile Telecommunications System (UMTS) Terrestrial Radio Access Network (E-UTRAN), a NextGen RAN (NG RAN), or some other type of RAN. The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 101 and 102 may further directly exchange communication data via a ProSe interface 105. The ProSe interface 105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 102 is shown to be configured to access an access point (AP) 106 via connection 107. The connection 107 can comprise a local wireless connection, such as a connection consistent with any IEEE 802.11 protocol, wherein the AP 106 would comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some embodiments, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management.

In accordance with some embodiments, the UEs 101 and 102 can be configured to communicate using Orthogonal Frequency-Division Multiplexing (OFDM) communication signals with each other or with any of the RAN nodes 111 and 112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 111 and 112 to the UEs 101 and 102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 101 and 102. The physical downlink control channel (PDCCH) may carry information about the transport format and resource allocations related to the PDSCH channel, among other things. It may also inform the UEs 101 and 102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 111 and 112 based on channel quality information fed back from any of the UEs 101 and 102. The downlink resource assignment information may be sent on the PDCCH used for (e.g., assigned to) each of the UEs 101 and 102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, 8, or 16).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 110 is shown to be communicatively coupled to a core network (CN) 120—via an S1 interface 113. In embodiments, the CN 120 may be an evolved packet core (EPC) network, a NextGen Packet Core (NPC) network, or some other type of CN. In this embodiment the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this embodiment, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities may include lawful intercept, charging, and some policy enforcement.

The P-GW 123 may terminate an SGi interface toward a PDN. The P-GW 123 may route data packets between the EPC network 123 and external networks such as a network including the application server 130 (alternatively referred to as application function (AF)) via an Internet Protocol (IP) interface 125. Generally, the application server 130 may be an element offering applications that use IP bearer resources with the core network (e.g., UMTS Packet Services (PS) domain, LTE PS data services, etc.). In this embodiment, the P-GW 123 is shown to be communicatively coupled to an application server 130 via an IP communications interface 125. The application server 130 can also be configured to support one or more communication services (e.g., Voice-over-Internet Protocol (VoIP) sessions, PTT sessions, group communication sessions, social networking services, etc.) for the UEs 101 and 102 via the CN 120.

The P-GW 123 may further be a node for policy enforcement and charging data collection. Policy and Charging Enforcement Function (PCRF) 126 is the policy and charging control element of the CN 120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 126 may be communicatively coupled to the application server 130 via the P-GW 123. The application server 130 may signal the PCRF 126 to indicate a new service flow and select the appropriate Quality of Service (QoS) and charging parameters. The PCRF 126 may provision this rule into a Policy and Charging Enforcement Function (PCEF) (not shown) with the appropriate traffic flow template (TFT) and QoS class of identifier (QCI), which commences the QoS and charging as specified by the application server 130.

Figure 2:
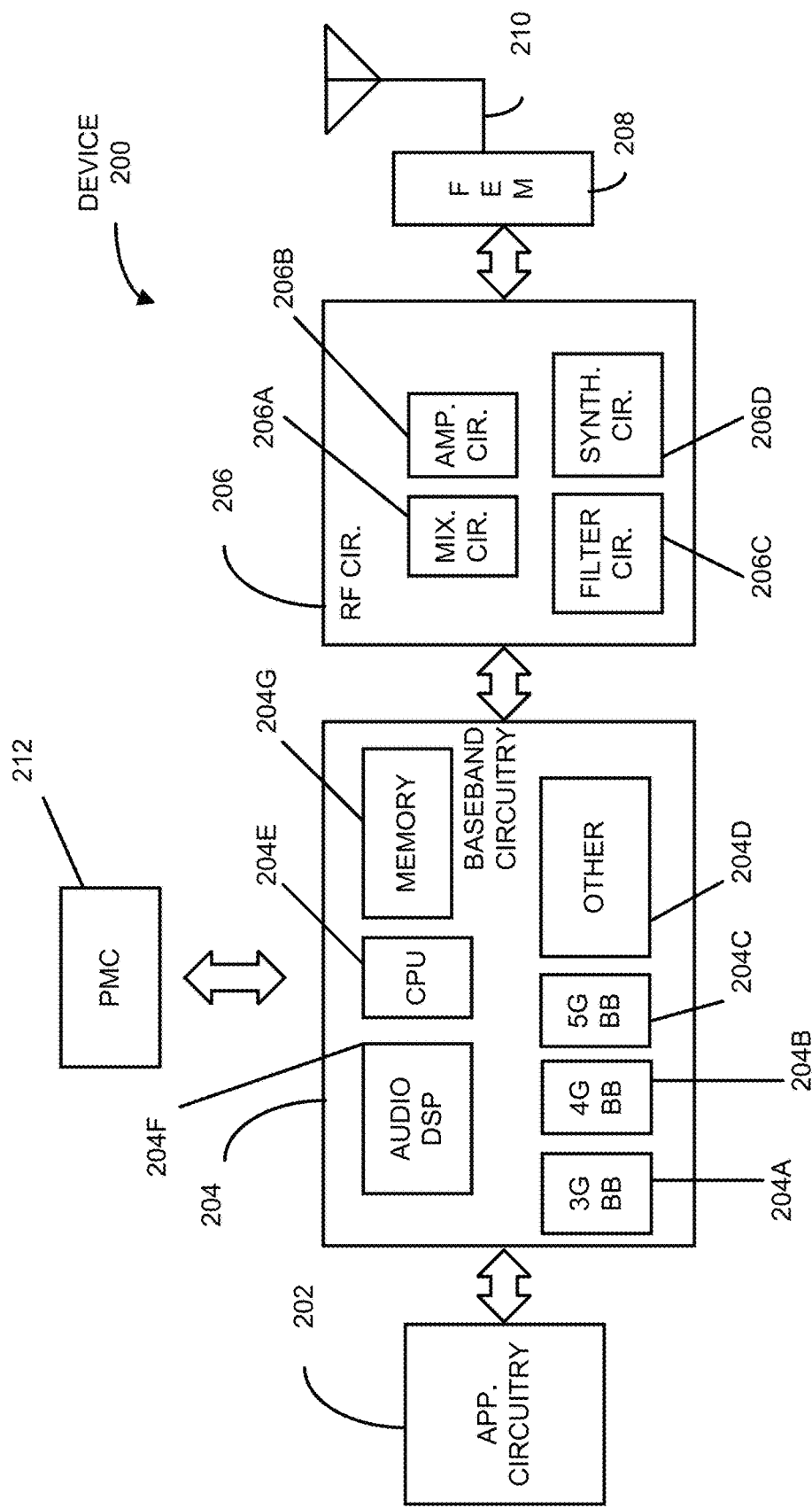
FIG. 2 is a diagram illustrating example components of a device that can be employed in accordance with various aspects discussed herein.

FIG. 2 illustrates example components of a device 200 in accordance with some embodiments. In some embodiments, the device 200 may include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 may be included in a UE or a RAN node. In some embodiments, the device 200 may include less elements (e.g., a RAN node may not utilize application circuitry 202, and instead include a processor/controller to process IP data received from an EPC). In some embodiments, the device 200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 200. In some embodiments, processors of application circuitry 202 may process IP data packets received from an EPC.

The baseband circuitry 204 may include circuitry such as, but not limited to, one or more single-core or multi-core processors. The baseband circuitry 204 may include one or more baseband processors or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) may handle various radio control functions that enable communication with one or more radio networks via the RF circuitry 206. In other embodiments, some or all of the functionality of baseband processors 204A-D may be included in modules stored in the memory 204G and executed via a Central Processing Unit (CPU) 204E. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, or constellation mapping/demapping functionality. In some embodiments, encoding/decoding circuitry of the baseband circuitry 204 may include convolution, tailbiting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include one or more audio digital signal processor(s) (DSP) 204F. The audio DSP(s) 204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the receive signal path of the RF circuitry 206 may include mixer circuitry 206a, amplifier circuitry 206b and filter circuitry 206c. In some embodiments, the transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c.

In some embodiments, the mixer circuitry 206a of the receive signal path and the mixer circuitry 206a of the transmit signal path may include two or more mixers and may be arranged for quadrature downconversion and upconversion, respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210. In various embodiments, the amplification through the transmit or receive signal paths may be done solely in the RF circuitry 206, solely in the FEM 208, or in both the RF circuitry 206 and the FEM 208.

In some embodiments, the FEM circuitry 208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 may manage power provided to the baseband circuitry 204. In particular, the PMC 212 may control power-source selection, voltage scaling, battery charging, or DC-to-DC conversion. The PMC 212 may often be included when the device 200 is capable of being powered by a battery, for example, when the device is included in a UE. The PMC 212 may increase the power conversion efficiency while providing desirable implementation size and heat dissipation characteristics.

While FIG. 2 shows the PMC 212 coupled only with the baseband circuitry 204. However, in other embodiments, the PMC 212 may be additionally or alternatively coupled with, and perform similar power management operations for, other components such as, but not limited to, application circuitry 202, RF circuitry 206, or FEM 208.

In some embodiments, the PMC 212 may control, or otherwise be part of, various power saving mechanisms of the device 200. For example, if the device 200 is in an RRC_Connected state, where it is still connected to the RAN node as it expects to receive traffic shortly, then it may enter a state known as Discontinuous Reception Mode (DRX)

after a period of inactivity. During this state, the device 200 may power down for brief intervals of time and thus save power.

If there is no data traffic activity for an extended period of time, then the device 200 may transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 202 and processors of the baseband circuitry 204 may be used to execute elements of one or more instances of a protocol stack. For example, processors of the baseband circuitry 204, alone or in combination, may be used execute Layer 3, Layer 2, or Layer 1 functionality, while processors of the application circuitry 204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 3:
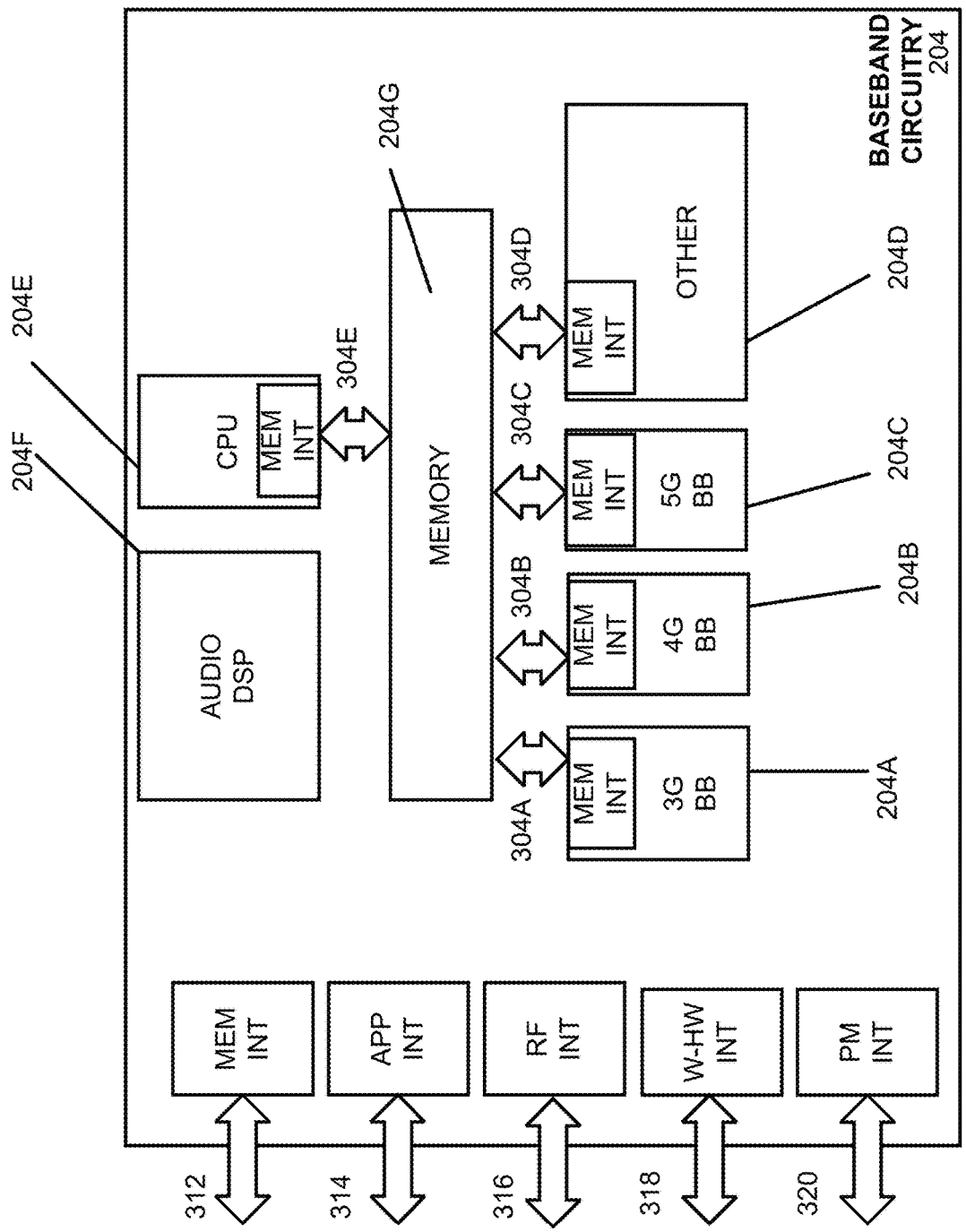
FIG. 3 is a diagram illustrating example interfaces of baseband circuitry that can be employed in accordance with various aspects discussed herein.

FIG. 3 illustrates example interfaces of baseband circuitry in accordance with some embodiments. As discussed above, the baseband circuitry 204 of FIG. 2 may comprise processors 204A-204E and a memory 204G utilized by said processors. Each of the processors 204A-204E may include a memory interface, 304A-304E, respectively, to send/receive data to/from the memory 204G.

The baseband circuitry 204 may further include one or more interfaces to communicatively couple to other circuitries/devices, such as a memory interface 312 (e.g., an interface to send/receive data to/from memory external to the baseband circuitry 204), an application circuitry interface 314 (e.g., an interface to send/receive data to/from the application circuitry 202 of FIG. 2), an RF circuitry interface 316 (e.g., an interface to send/receive data to/from RF circuitry 206 of FIG. 2), a wireless hardware connectivity interface 318 (e.g., an interface to send/receive data to/from Near Field Communication (NFC) components, Bluetooth® components (e.g., Bluetooth® Low Energy), Wi-Fi® components, and other communication components), and a power management interface 320 (e.g., an interface to send/receive power or control signals to/from the PMC 212).

In various aspects, embodiments discussed herein can facilitate techniques of inter-cell BM (Beam Management) via L1 (Layer 1) via one or more variations of a first set of techniques and/or a second set of techniques. The first set of techniques discussed herein can facilitate L1 inter-cell BM via SSB (Synchronization Signal Block). The second set of techniques discussed herein can facilitate L1 inter-cell BM via Synchronization CSI (Channel State Information)-RS (Reference Signal).

Figure 4:
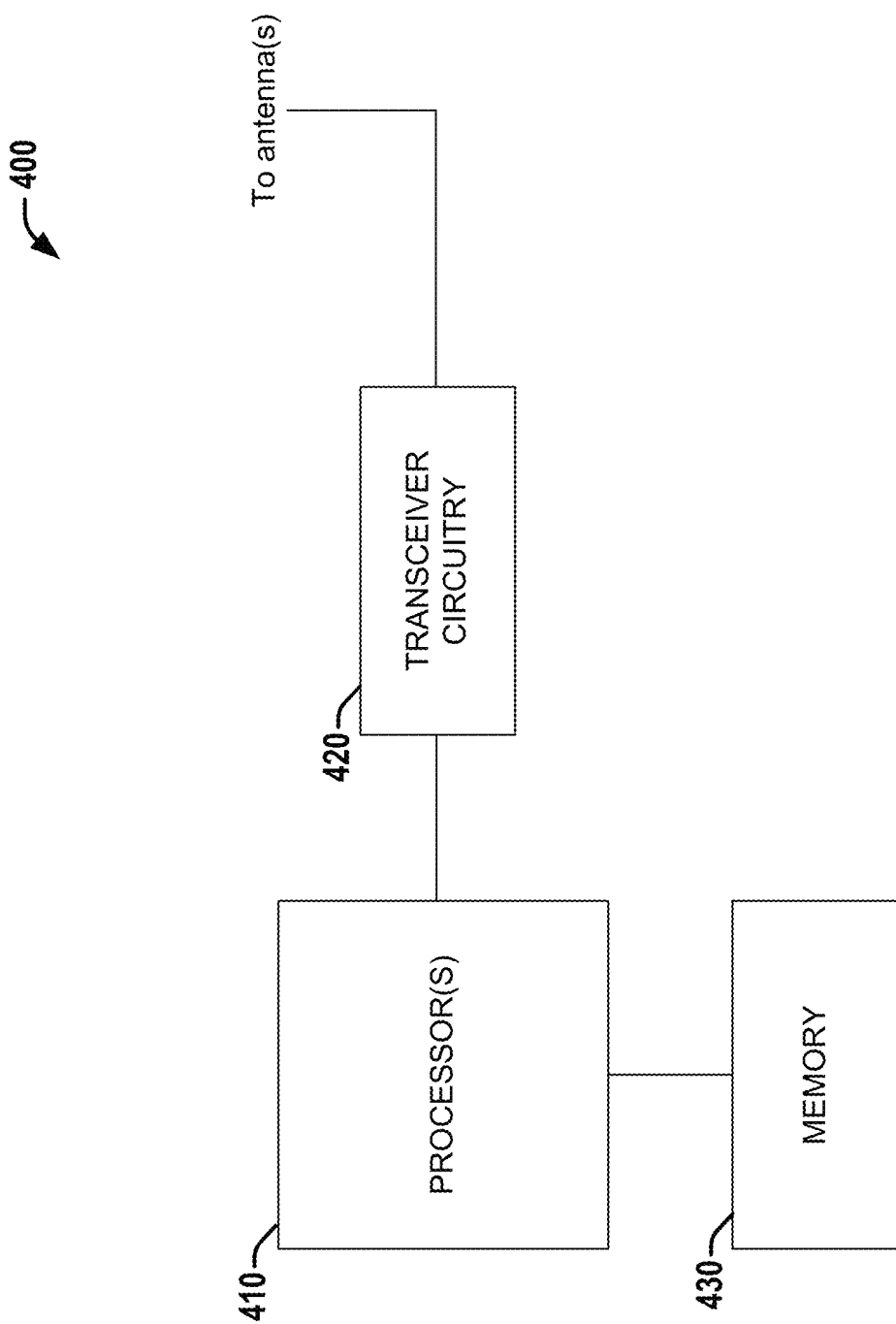
FIG. 4 is a block diagram illustrating a system employable at a UE (User Equipment) that facilitates L1 (Layer 1) inter-cell beam management, according to various aspects described herein.

Referring to FIG. 4, illustrated is a block diagram of a system 400 employable at a UE (User Equipment) that facilitates L1 (Layer 1)-based inter-cell beam management, according to various aspects described herein. System 400 can include one or more processors 410 (e.g., one or more baseband processors such as one or more of the baseband processors discussed in connection with FIG. 2 and/or FIG. 3) comprising processing circuitry and associated interface (s) (e.g., one or more interface(s) discussed in connection with FIG. 3), transceiver circuitry 420 (e.g., comprising part or all of RF circuitry 206, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 430 (which can comprise any of a variety of storage mediums and can store instructions and/or data associated with one or more of processor(s) 410 or transceiver circuitry 420). In various aspects, system 400 can be included within a user equipment (UE). As described in greater detail below, system 400 can facilitate L1-based inter-cell beam management according to a first set of techniques employing SSB (Synchronization Signal Block)-based L1 inter-cell beam management and/or a second set of techniques employing Sync (Synchronization)-CSI (Channel State Information)-RS (Reference Signal)-based L1 inter-cell beam management.

In various aspects discussed herein, signals and/or messages can be generated and output for transmission, and/or transmitted messages can be received and processed. Depending on the type of signal or message generated, outputting for transmission (e.g., by processor(s) 410, processor(s) 510, etc.) can comprise one or more of the following: generating a set of associated bits that indicate the content of the signal or message, coding (e.g., which can include adding a cyclic redundancy check (CRC) and/or coding via one or more of turbo code, low density paritycheck (LDPC) code, tailbiting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 410, processor (s) 510, etc.) can comprise one or more of: identifying physical resources associated with the signal/message, detecting the signal/message, resource element group deinterleaving, demodulation, descrambling, and/or decoding.

Figure 5:
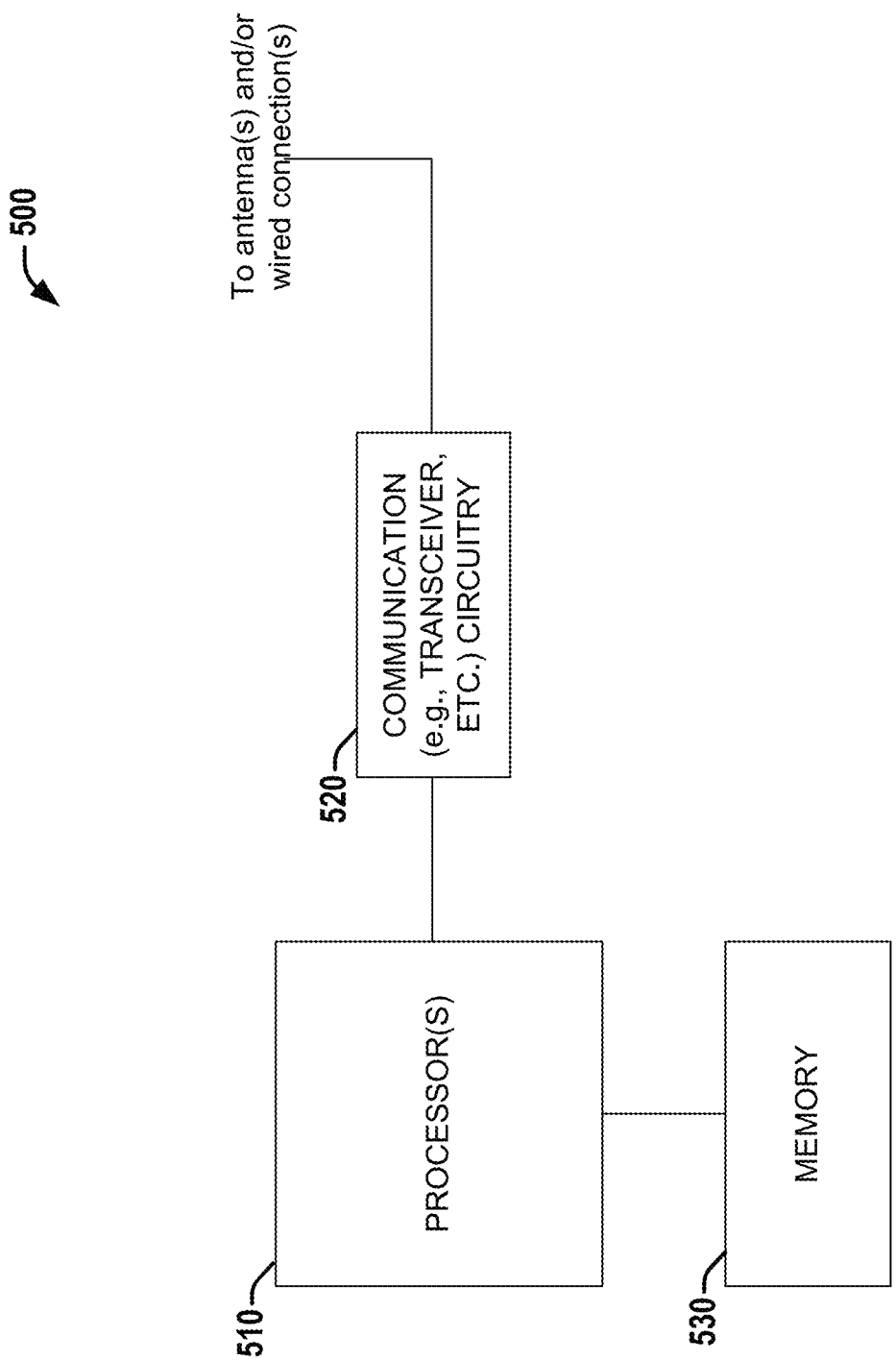
FIG. 5 is a block diagram illustrating a system employable at a BS (Base Station) that facilitates L1 inter-cell beam management, according to various aspects described herein.

Referring to FIG. 5, illustrated is a block diagram of a system 500 employable at a BS (Base Station) that facilitates L1-based inter-cell beam management, according to various aspects described herein. System 500 can include one or more processors 510 (e.g., one or more baseband processors such as one or more of the baseband processors discussed in connection with FIG. 2 and/or FIG. 3) comprising processing circuitry and associated interface(s) (e.g., one or more interface(s) discussed in connection with FIG. 3), communication circuitry 520 (e.g., which can comprise circuitry for one or more wired (e.g., X2, etc.) connections and/or part or all of RF circuitry 206, which can comprise one or more of transmitter circuitry (e.g., associated with one or more transmit chains) or receiver circuitry (e.g., associated with one or more receive chains), wherein the transmitter circuitry and receiver circuitry can employ common circuit elements, distinct circuit elements, or a combination thereof), and memory 530 (which can comprise any of a variety of storage mediums and can store instructions and/or data associated with one or more of processor(s) 510 or communication circuitry 520). In various aspects, system 500 can be included within an Evolved Universal Terrestrial Radio Access Network (E-UTRAN) Node B (Evolved Node B, eNodeB, or eNB), next generation Node B (gNodeB or gNB) or other base station or TRP (Transmit/Receive Point) in a wireless communications network. In some aspects, the processor(s) 510, communication circuitry 520, and the memory 530 can be included in a single device, while in other aspects, they can be included in different devices, such as part of a distributed architecture. As described in greater detail below, system 400 can facilitate L1-based inter-cell beam management according to a first set of techniques employing SSB-based L1 inter-cell beam management and/ or a second set of techniques employing Sync-CSI-RS-based L1 inter-cell beam management.

In a 3GPP (Third Generation Partnership Project) new radio (NR) system, CSI (Channel State Information)-RS (Reference Signal) has been standardized for time/frequency tracking, CSI computation and L1 (Layer 1, the Physical layer)-RSRP (Reference Signal Received Power) reporting. Specifically, the CSI-RS for time/frequency tracking (e.g., tracking reference signal (TRS)) can be quasi-collocated (QCLed) with a cell-defining synchronization signal block (SSB), and can be configured as the reference signal for L3 (Layer 3, the Radio Resource Control layer) mobility measurement report(s). As such, the following CSI-RS configuration has been defined in 3GPP TS (Technical Specification) 38.331. Referring to FIG. 6, illustrated is a diagram showing RRC configuration of TRS used for L3 mobility measurement, in connection with various aspects discussed herein.

The CSI-RS for L1-RSRP computation is intended to be used for L1 beam management (BM) to be reported by physical uplink control/shared channel (PUCCH/PUSCH). This BM is reported in a more flexible and quicker manner in terms of several tens of milliseconds, instead of several hundreds of milliseconds for RRC signaling. The CSI-RS resource for BM uses so-called non-zero power CSI-RS (NZP-CSI-RS), and has a configuration defined in 3GPP TS 38.331. Referring to FIG. 7, illustrated is a diagram showing RRC configuration of NZP-CSI-RS resource for CSI calculation and BM, in connection with various aspects discussed herein.

According to 3GPP TS 38.214, the bandwidth of BM CSI-RS depends on the bandwidth part (BWP) of the linked report setting defined in the measurement link setting. Moreover, it is discussed in 3GPP R1-1802949 that existing CSI-RS measurement accuracy for BM is of insufficient quality due to the large timing/frequency errors in case of non-QCLed transmission of the CSI-RS and the associated SSB. As an example, this may occur if CSI-RS is transmitted with a very narrow beam from the TRP of neighbor cell(s) which transmit SSB with wider beam or do not transmit SSB at all, in the case of a silent node. In such scenarios, the reference signal receive power (RSRP) of the CSI-RS can be estimated with a very poor quality, so that a pessimistic RSRP estimate is obtained.

In various embodiments discussed herein, techniques to enhance the time/frequency synchronization capability of CSI-RS configuration for the support of a L1 inter-cell beam management procedure.

As noted above, existing systems do not support L1 inter-cell beam management. In existing systems, inter-cell beam management can only be realized via an L3 mobility measurement procedure, which is relatively slow and not suitable for inter-cell collaborative resource scheduling on a slot and/or subframe basis.

In various embodiments, either a first set of techniques or a second set of techniques can be employed for multi-beam transmission of a PDCCH (Physical Downlink Control Channel) ordered CFRA (Contention Free Random Access) procedure.

The first set of techniques can employ SSB (Synchronization Signal Block)-based L1 inter-cell beam management. In embodiments employing the first set of techniques, the gNB (next generation Node B, e.g., comprising system 500) can include (e.g., via processor(s) 510) the information of SSBs transmitted in one or more neighbor cells to the SSB resources configured for L1 beam management. Specifically, the neighbor cell PCI (Physical Cell Identifier), SSB sub- carrier offset with respect to the current PRB (Physical Resource Block) boundary, SSB periodicity, and actually transmitted SSB in the neighbor cell(s) can be signaled to the UE (e.g., via signaling generated by processor(s) 510, transmitted via communication circuitry 520, received via transceiver circuitry 420, and processed by processor(s) 410). Therefore, the UE can fully determine (e.g., via processor(s) 410) the time/frequency resource(s) of SSB transmission(s) of the neighbor cell(s). This can enable the UE to report L1-RSRP of SSBs from neighbor cells in PUCCH/PUSCH (Physical Uplink Shared Channel) in the same way as that of the SSBs in the current serving cell (e.g., via a report generated by processor(s) 410, transmitted via transceiver circuitry 520, received via communication circuitry 520, and processed by processor(s) 510). As a result, SSB-based L1 inter-cell beam management can be realized, as discussed in greater detail below.

The second set of techniques can employ Synchronization CSI-RS (Sync CSI-RS)-based L1 inter-cell beam management. In embodiments employing the second set of techniques, the gNB (e.g., comprising system 500) can configure (e.g., via configuration signaling generated by processor(s) 510, transmitted via communication circuitry 520, received via transceiver circuitry 420, and processed by processor(s) 410) what is referred to herein as Sync-CSI-RS resource set(s) that can be transmitted from the neighbor cell(s) with continuous bandwidth similar to that of SSB. Specifically, the Sync CSI-RS resource set(s) can comprise localized NZP (Non-Zero Power)-CSI-RS resources with or without CDM (Code Division Multiplexing) options. The configured Sync-CSI-RS resource set(s) can employ a narrower beamwidth than SSB, and can provide sufficient time/frequency synchronization accuracy on its own. As a result, more accurate RSRP can be estimated from Sync-CSI-RS than the existing approach based on tracking CSI-RS with QCLed SSB. As a result, L1 inter-cell beam management can also be realized using the proposed Sync-CSI-RS, as discussed in greater detail below.

Embodiments discussed herein can facilitate L1 inter-cell beam management via straightforward extension(s) of existing 3GPP techniques, as discussed in greater detail herein. In various embodiments, via techniques discussed herein, inter-cell beam management can be realized using SSB or Sync CSI-RS transmitted from neighbor cell(s). As a result, more efficient resource scheduling among multiple cells can be achieved.

The first set of techniques discussed herein relates to SSB-based L1 inter-cell beam management.

In embodiments employing the first set of techniques, for SSB based inter-cell beam management, the ssb-Resources (SSB resources) IE (Information Element) in the CSI-ResourceConfig (CSI Resource Configuration) IE can include a list of SSB indexes for L1-RSRP calculation of beam management. The SSB burst periodicity and actual transmitted SSBs in the serving cell can be obtained from the SIB1 (System Information Block Type 1) signaling.

To support SSB based L1 inter-cell BM, the ssb-Resources (e.g., generated by processor(s) 510, transmitted via communication circuitry 520, received via transceiver circuitry 420, and processed by processor(s) 410) IE can comprise some or all of the following information: (1) a Primary-SSBs-list (Primary SSBs list) parameter, which can be a list of SSB index(es) to be measured in the current cell; (2) a (optional) SSB-list #2 (SSB list #2) parameter, which can comprise SSB information of cell #2, which can comprise (a) the PCI of cell #2 (and, optionally, depending on the scenario, the PCI for cell #3, etc.); (b) a ssb-subcarrierOffset (SSB subcarrier offset) parameter, which can indicate a SSB subcarrier offset (e.g., of cell #2, etc.) with respect to the common resource block boundary in the current serving cell; (c) a ssb-PositionsInBurst (SSB Positions In Burst) parameter, which can indicate an actual transmitted SSB in the cell #2, and can comprise (i) a inOneGroup (In One Group) parameter, which can comprise 8 bits that indicate the SSB transmitted in one group, and/or (ii) a groupPresence (Group Presence) parameter, which can comprise 8 bits that indicate the actual transmitted SSB group; (d) a ssb-periodicity (SSB Periodicity) parameter, which can indicate the periodicity of SSB bursts in cell #2; and/or (e) a SSB-index-list (SSB index list) parameter, which can comprise a list of SSB indexes to be measured in cell #2; and/or (3) one or more (optional) additional SSB-list #n parameters, for example, a (optional) SSB-list #3 (SSB list #3) parameter, which can comprise SSB information of cell #3 (e.g., which can comprise similar parameters, etc., to the SSB information of cell #2 in SSB-list #2).

As described in the above list, for SSB based inter-cell BM, the cell ID, the SSB subcarrier offset, actual transmitted SSB instances and SSB index list to be measured in the neighbor cells can be included in the SSB resource configuration for CSI-ResourceConfig (e.g., generated by processor(s) 510, transmitted via communication circuitry 520, received via transceiver circuitry 420, and processed by processor(s) 410) used for BM and CSI calculation (e.g., by processor(s) 410).

The second set of techniques discussed herein relates to Synchronization-CSI-RS based L1 inter-cell beam management.

In embodiments employing the second set of techniques, to achieve similar time/frequency synchronization accuracy as that of SSB, the Synchronization-CSI-RS (Sync-CSI-RS) resource set comprised of NZP-CSI-RS resources which occupies a similar bandwidth as SSB can be configured according to either of a first or a second option.

A first option for the second set of techniques can comprise configuration based on CSI-RS without CDM (Code Division Multiplexing). Referring to FIG. 8, illustrated is a diagram showing an example configuration of Synchronization-CSI-RS sets with no CDM that can be employed (e.g., generated by processor(s) 510, transmitted via communication circuitry 520, received via transceiver circuitry 420, and processed by processor(s) 410) for Sync-CSI-RS based L1 inter-cell beam management, according to various aspects discussed herein.

As shown in FIG. 8, in various embodiments, the Sync-CSI-RS resource sets can comprise 8 NZP-CSI-RS resources without a CDM option occupying 11 physical resource blocks (PRBs), such that the bandwidth of Sync-CSI-RS is similar to SSB. In various embodiments, the scrambling IDs for the 8 NZP-CSI-RS resources can be the same or different. For example, the scrambling IDs for NZP-CSI-RS resources in the same OFDM symbol can be different, while the scrambling IDs for NZP-CSI-RS resource in same frequency location can be same. This can provide various advantages for UE implementation.

A second option for the second set of techniques can comprise configuration based on CSI-RS with CDM. Referring to FIG. 9, illustrated is a diagram showing an example configuration of Synchronization-CSI-RS sets with CDM that can be employed (e.g., generated by processor(s) 510, transmitted via communication circuitry 520, received via transceiver circuitry 420, and processed by processor(s) 410) for Sync-CSI-RS based L1 inter-cell beam management, according to various aspects discussed herein.

As shown in FIG. 9, in various embodiments, the Sync-CSI-RS resource sets can comprise 4 CDM based NZP-CSI-RS resources with single antenna port (AP) occupying 11 physical resource blocks (PRBs) so that the bandwidth of Sync-CSI-RS is similar to SSB. In various embodiments, the scrambling IDs for the 4 NZP-CSI-RS resources can be the same or different. For example, the 4 NZP-CSI-RS resources can use the same scrambling ID while applying different CDM codes for the configured AP (Antenna Port). Alternatively, the 4 NZP-CSI-RS resources can use different scrambling IDs while applying the same CDM code for the used AP.

To enable the first and second options discussed above, the RRC configuration of NZP-CSI-RS (e.g., which can be generated by processor(s) 510, transmitted via communication circuitry 520, received via transceiver circuitry 420, and processed by processor(s) 410) illustrated in FIG. 7 can be expanded to comprise some or all of the following information elements: (1) a frequency bandwidth, which can be defined in terms of the number of PRBs; (2) a starting PRB, which can be defined with respect to the starting point of current active BWP; and/or (3) an associated cell-defining SSB, which can indicate the physical cell ID (PCI) of the SSB and an optional SSB index.

Figure 10:
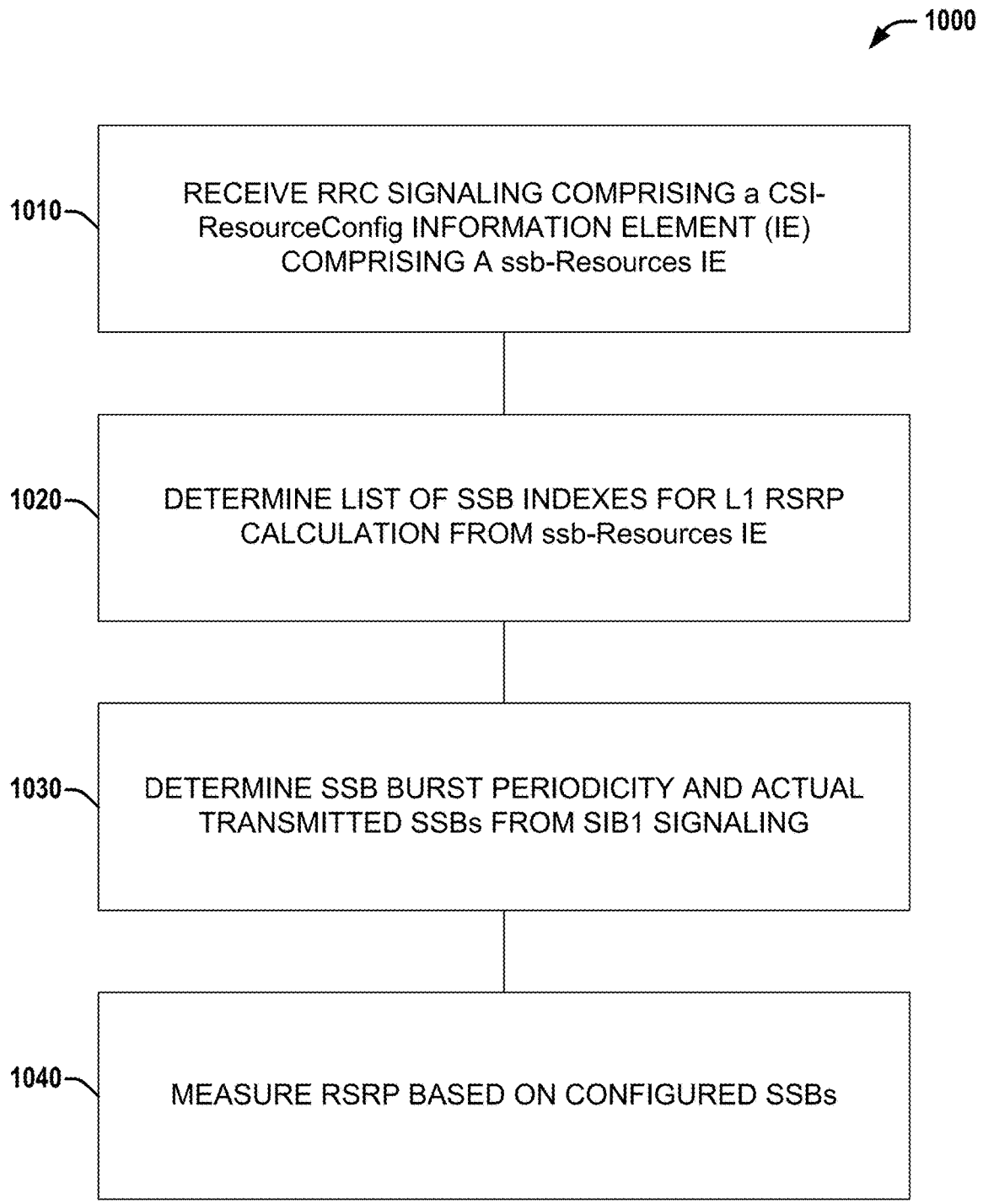
FIG. 10 is a flow diagram illustrating an example method employable at a UE that facilitates SSB (Synchronization Signal Block)-based L1 inter-cell beam management, according to various aspects discussed herein.

Referring to FIG. 10, illustrated is a flow diagram of a first example method 1000 employable at a UE that facilitates SSB (Synchronization Signal Block)-based L1 inter-cell beam management, according to various aspects discussed herein. In other aspects, a machine readable medium can store instructions associated with method 1000 that, when executed, can cause a UE to perform the acts of method 1000.

At 1010, RRC signaling can be received comprising a CSI-ResourceConfig IE (Information Element) comprising a ssb-Resources IE.

At 1020, a list of SSB indexes can be determined for L1 RSRP calculation from the ssb-Resources IE.

At 1030, SIB1 signaling can be received that indicates a SSB burst periodicity and actual transmitted SSB(s).

At 1040, RSRP can be measured based on the configured SBs.

Additionally or alternatively, method 1000 can include one or more other acts described herein in connection with various embodiments of system 400 discussed herein in connection with the first set of techniques.

Figure 11:
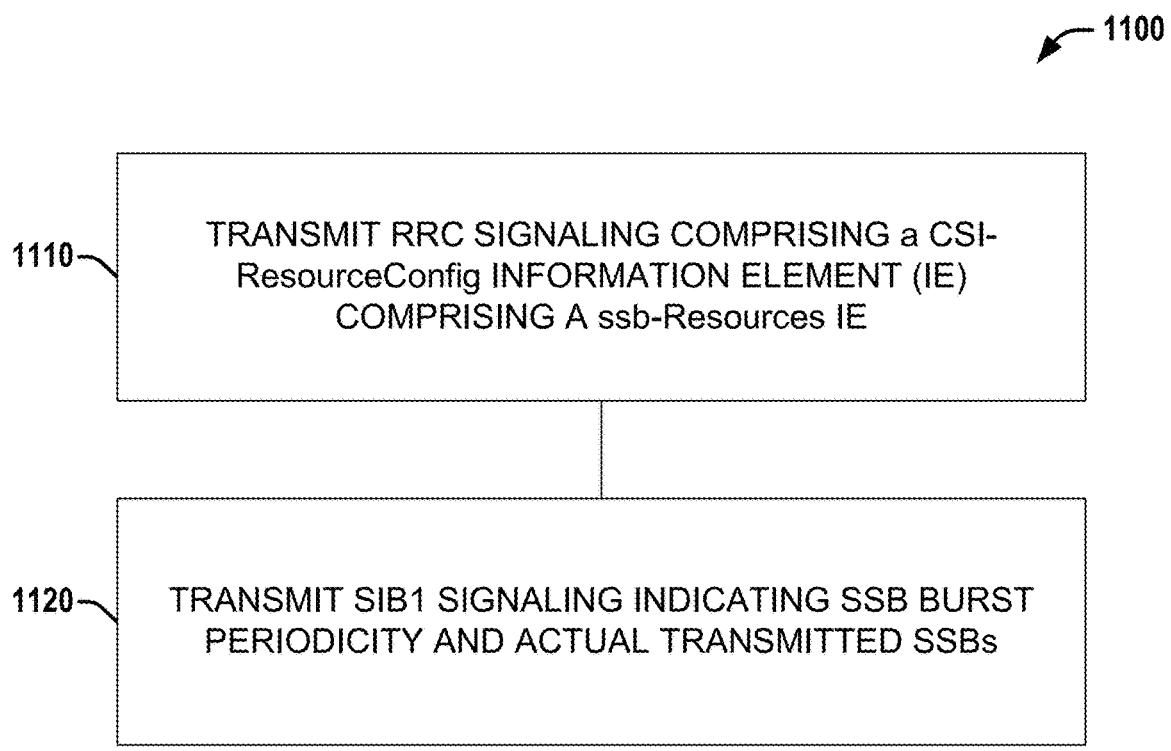
FIG. 11 is a flow diagram illustrating an example method employable at a BS that facilitates SSB-based L1 inter-cell beam management, according to various aspects discussed herein.

Referring to FIG. 11, illustrated is a flow diagram of a first example method 1100 employable at a BS (e.g., gNB, etc.) that facilitates SSB (Synchronization Signal Block)-based L1 inter-cell beam management, according to various aspects discussed herein. In other aspects, a machine readable medium can store instructions associated with method 1100 that, when executed, can cause a BS to perform the acts of method 1100.

At 1110, RRC signaling can be transmitted comprising a CSI-ResourceConfig 1E (Information Element) comprising a ssb-Resources IE.

At 1120, SIB1 signaling can be transmitted that indicates a SSB burst periodicity and actual transmitted SSB(s).

Additionally or alternatively, method 1100 can include one or more other acts described herein in connection with various embodiments of system 500 discussed herein in connection with the first set of techniques.

Figure 12:
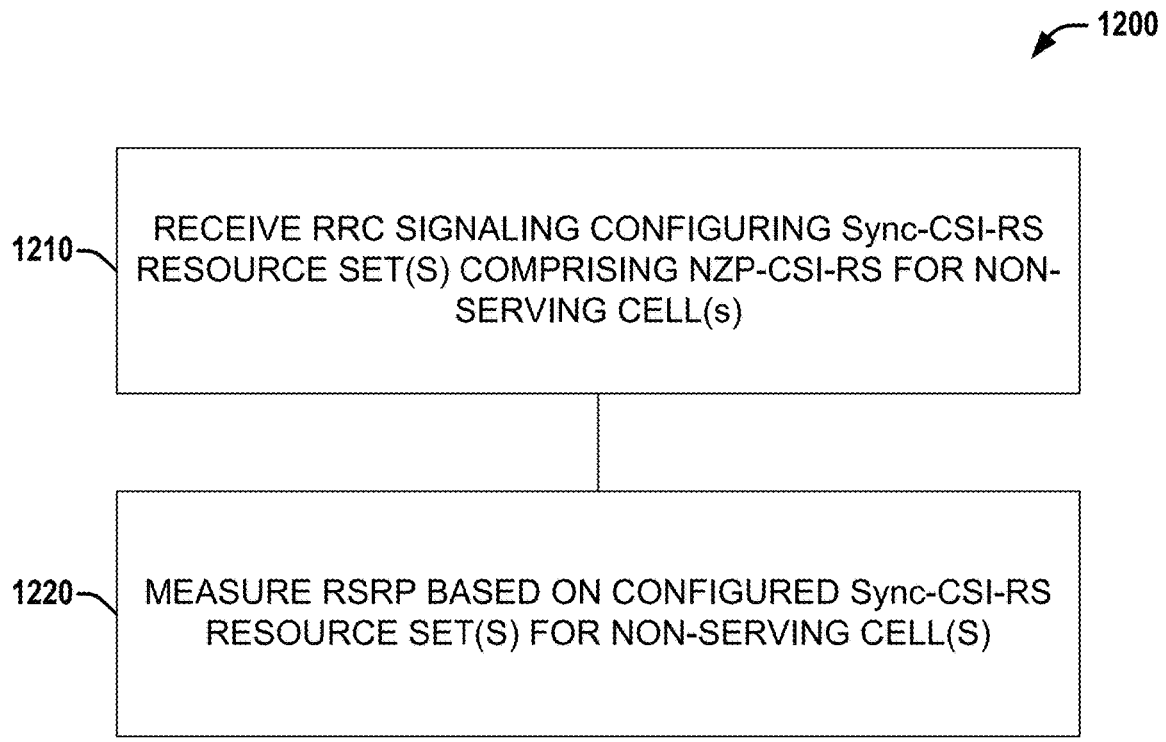
FIG. 12 is a flow diagram illustrating an example method employable at a UE that facilitates Sync (Synchronization)-CSI (Channel State Information)-RS (Reference Signal)-based L1 inter-cell beam management, according to various aspects discussed herein.

Referring to FIG. 12, illustrated is a flow diagram of a first example method 1200 employable at a UE that facilitates Sync-CSI-RS-based L1 inter-cell beam management, according to various aspects discussed herein. In other aspects, a machine readable medium can store instructions associated with method 1200 that, when executed, can cause a UE to perform the acts of method 1200.

At 1210, RRC signaling can be received that configures one or more Sync-CSI-RS resource sets comprising NZP-CSI-RS for one or more non-serving cells.

At 1220, RSRP can be measured based on the one or more configured Sync-CSI-RS resource sets for the one or more non-serving cells.

Additionally or alternatively, method 1200 can include one or more other acts described herein in connection with various embodiments of system 400 discussed herein in connection with the second set of techniques.

Figure 13:
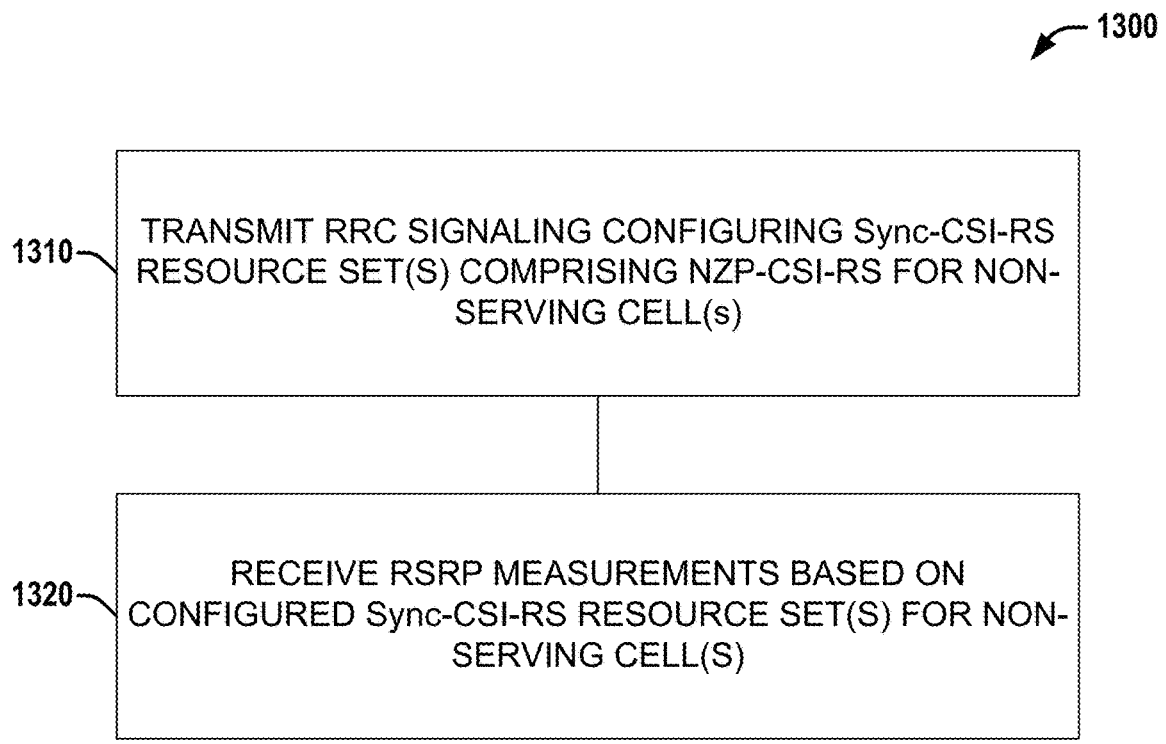
FIG. 13 is a flow diagram illustrating an example method employable at a BS that facilitates Sync-CSI-RS-based L1 inter-cell beam management, according to various aspects discussed herein.

Referring to FIG. 13, illustrated is a flow diagram of a first example method 1300 employable at a BS (e.g., gNB, etc.) that facilitates Sync-CSI-RS-based L1 inter-cell beam management, according to various aspects discussed herein. In other aspects, a machine readable medium can store instructions associated with method 1300 that, when executed, can cause a BS to perform the acts of method 1300.

At 1310, RRC signaling can be transmitted that configures one or more Sync-CSI-RS resource sets comprising NZP-CSI-RS for one or more non-serving cells.

At 1320, RSRP measurements based on the one or more configured Sync-CSI-RS resource sets can be received for the one or more non-serving cells.

Additionally or alternatively, method 1300 can include one or more other acts described herein in connection with various embodiments of system 500 discussed herein in connection with the second set of techniques.

Examples herein can include subject matter such as a method, means for performing acts or blocks of the method, at least one machine-readable medium including executable instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described.

In a first example embodiment (associated with the first set of techniques), for SSB-based intra-cell beam management, the ssb-Resources in the CSI-ResourceConfig (e.g., generated by processor(s) 510, transmitted via communication circuitry 520, received via transceiver circuitry 420, and processed by processor(s) 410) can comprise the list of SSB indexes for L1-RSRP calculation of beam management, and the SSB burst periodicity and actual transmitted SSBs in the serving cell can be obtained from the SIB1 signaling.

A second example embodiment comprises the first example embodiment, wherein the ssb-Resources configured for inter-cell BM can include the Primary-SSBs-list #1, which is a list of SSB index(es) to be measured and transmitted in the current cell.

A third example embodiment comprises the second example embodiment, wherein the ssb-Resources can further comprise one or more parameters SSB-list #n, wherein n>1, each of which comprises the SSB information of cell #n.

A fourth example embodiment comprises the third example embodiment, wherein the SSB-list #2 can comprise some or all of the following information: (a) PCI of cell #2; (b) ssb-subcarrierOffset: SSB subcarrier offset with respect to the common resource block boundary in the current serving cell; (c) ssb-PositionsInBurst: actual transmitted SSB in the cell #2, which can comprise (1) inOneGroup: 8 bits indicate the SSB transmitted in one group and/or (2) groupPresence: 8 bits indicate the actual transmitted SSB group; (d) ssb-periodicity: the periodicity of SSB bursts in cell #2; and/or (e) SSB-index-list: list of SSB indexes to be measured in cell #2.

In a fifth example embodiment (associated with the second set of techniques), to achieve similar time/frequency synchronization accuracy as that of SSB, the gNB can configure to the UE (e.g., via configuration signaling generated by processor(s) 510, transmitted via communication circuitry 520, received via transceiver circuitry 420, and processed by processor(s) 410), for each of one or more non-serving cells, an associated Synchronization-CSI-RS (Sync-CSI-RS) resource set comprised of NZP-CSI-RS resources which occupies similar bandwidth as a SSB.

A sixth example embodiment comprises the fifth example embodiment, wherein the Sync-CSI-RS resource set(s) can comprise 8 NZP-CSI-RS resources without a CDM option occupying 11 physical resource blocks (PRBs), such that the bandwidth of Sync-CSI-RS is similar to the SSB.

A seventh example embodiment comprises the sixth example embodiment, wherein scrambling IDs for the 8 NZP-CSI-RS resources can be the same or different.

An eighth example embodiment comprises the seventh example embodiment, wherein the scrambling IDs for the NZP-CSI-RS resources in the same OFDM symbol can be different while the scrambling IDs for NZP-CSI-RS resource in the same frequency location can be the same.

A ninth example embodiment comprises the fifth example embodiment, wherein the Sync-CSI-RS resource sets can comprise 4 CDM-based NZP-CSI-RS resources with single antenna port (AP) occupying 11 physical resource blocks (PRBs), such that the bandwidth of Sync-CSI-RS is similar to SSB.

A tenth example embodiment comprises the ninth example embodiment, wherein the scrambling IDs for the 4 NZP-CSI-RS resources can be the same or different.

An eleventh example embodiment comprises the tenth example embodiment, wherein the 4 NZP-CSI-RS resources can use the same scrambling ID while applying different CDM values for the configured AP or wherein the 4 NZP-CSI-RS resources can use different scrambling IDs while applying the same CDM value for the used AP.

A twelfth example embodiments comprises any of the ninth through eleventh example embodiments, wherein the RRC configuration of NZP-CSI-RS can be expanded to comprise some or all of the following information elements: (1) Frequency bandwidth: defined in terms of number of PRBs; (2) Starting PRB: defined with respect to the starting point of current active BWP (Bandwidth Part); and/or (3) Associated cell-defining SSB: indicate the physical cell ID (PCI) of the SSB and optional SSB index.

Example 1 is an apparatus configured to be employed in a UE (User Equipment), comprising: a memory interface; and processing circuitry configured to: process RRC (Radio Resource Control) signaling comprising a CSI-ResourceConfig (Channel State Information Resource Configuration) IE (Information Element) that comprises a ssb-Resources IE; determine a list of SSB (Synchronization Signal Block) indexes for L1 (Layer 1) RSRP (Reference Signal Received Power) calculation from the ssb-Resources IE; determine a SSB burst periodicity and one or more actual transmitted SSBs in a serving cell from SIB1 (System Information Block Type 1) signaling; and send the list of SSB indexes for L1 RSRP calculation to a memory via the memory interface.

Example 2 comprises the subject matter of any variation of any of example(s) 1, wherein the ssb-Resources IE comprises a SSB-list #1 parameter that comprises a list of one or more SSB indexes to be measured in the serving cell.

Example 3 comprises the subject matter of any variation of any of example(s) 2, wherein the ssb-Resources IE comprises a SSB-list #2 parameter that comprises SSB information of cell #2, wherein cell #2 is different than the serving cell.

Example 4 comprises the subject matter of any variation of any of example(s) 3, wherein the SSB-list #2 parameter comprises one or more of: a PCI (Physical Cell Identifier) of cell #2; a ssb-subcarrierOffset (SSB Subcarrier Offset) parameter for cell #2 that indicates a SSB subcarrier offset with respect to a common resource block boundary of the serving cell; a ssb-PositionsInBurst (SSB Positions In Burst) parameter for cell #2 that indicates one or more actual transmitted SSBs in cell #2, wherein the ssb-PositionsInBurst parameter for cell #2 comprises one or more of an InOneGroup (In One Group) parameter for cell #2 comprising 8 bits that indicate an associated SSB in one group of cell #2 and a groupPresence (Group Presence) parameter for cell #2 comprising 8 bits that indicate an actual transmitted SSB group for cell #2; a ssb-periodicity (SSB periodicity) parameter for cell #2 that indicates a periodicity of SSB bursts in cell #2; or a SSB-index-list (SSB Index List) parameter for cell #2 that indicates a list of one or more SSB indexes to be measured in cell #2.

Example 5 comprises the subject matter of any variation of any of example(s) 3-4, wherein the ssb-Resources IE comprises a SSB-list #n parameter that comprises SSB information of cell #n, wherein n is an integer greater than 2, and cell #n is different than the serving cell and cell #2.

Example 6 comprises the subject matter of any variation of any of example(s) 5, wherein the SSB-list #n parameter comprises one or more of: a PCI (Physical Cell Identifier) of cell #n; a ssb-subcarrierOffset (SSB Subcarrier Offset) parameter for cell #n that indicates a SSB subcarrier offset with respect to a common resource block boundary of the serving cell; a ssb-PositionsInBurst (SSB Positions In Burst) parameter for cell #n that indicates one or more actual transmitted SSBs in cell #n, wherein the ssb-PositionsInBurst parameter for cell #n comprises one or more of an InOneGroup (In One Group) parameter for cell #n comprising 8 bits that indicate an associated SSB in one group of cell #n and a groupPresence (Group Presence) parameter for cell #n comprising 8 bits that indicate an actual transmitted SSB group for cell #n; a ssb-periodicity (SSB periodicity) parameter for cell #n that indicates a periodicity of SSB bursts in cell #n; or a SSB-index-list (SSB Index List) parameter for cell #n that indicates a list of one or more SSB indexes to be measured in cell #n.

Example 7 is an apparatus configured to be employed in a gNB (next generation Node B), comprising: a memory interface; and processing circuitry configured to: generate RRC (Radio Resource Control) signaling comprising a CSI-ResourceConfig (Channel State Information Resource Configuration) IE (Information Element) that comprises a ssb-Resources IE, wherein the ssb-Resources IE comprises a list of SSB (Synchronization Signal Block) indexes for L1 (Layer 1) RSRP (Reference Signal Received Power) calculation; generate SIB1 (System Information Block Type 1) signaling that indicates a SSB burst periodicity and one or more actual transmitted SSBs in a serving cell; and send the list of SSB indexes for L1 RSRP calculation to a memory via the memory interface.

Example 8 comprises the subject matter of any variation of any of example(s) 7, wherein the ssb-Resources IE comprises a SSB-list #1 parameter that comprises a list of one or more SSB indexes to be measured in the serving cell.

Example 9 comprises the subject matter of any variation of any of example(s) 8, wherein the ssb-Resources IE comprises a SSB-list #2 parameter that comprises SSB information of cell #2, wherein cell #2 is different than the serving cell.

Example 10 comprises the subject matter of any variation of any of example(s) 9, wherein the SSB-list #2 parameter comprises one or more of: a PCI (Physical Cell Identifier) of cell #2; a ssb-subcarrierOffset (SSB Subcarrier Offset) parameter for cell #2 that indicates a SSB subcarrier offset with respect to a common resource block boundary of the serving cell; a ssb-PositionsInBurst (SSB Positions In Burst) parameter for cell #2 that indicates one or more actual transmitted SSBs in cell #2, wherein the ssb-PositionsInBurst parameter for cell #2 comprises one or more of an InOneGroup (In One Group) parameter for cell #2 comprising 8 bits that indicate an associated SSB in one group of cell #2 and a groupPresence (Group Presence) parameter for cell #2 comprising 8 bits that indicate an actual transmitted SSB group for cell #2; a ssb-periodicity (SSB periodicity) parameter for cell #2 that indicates a periodicity of SSB bursts in cell #2; or a SSB-index-list (SSB Index List) parameter for cell #2 that indicates a list of one or more SSB indexes to be measured in cell #2.

Example 11 comprises the subject matter of any variation of any of example(s) 9-10, wherein the ssb-Resources IE comprises a SSB-list #n parameter that comprises SSB information of cell #n, wherein n is an integer greater than 2, and cell #n is different than the serving cell and cell #2.

Example 12 comprises the subject matter of any variation of any of example(s) 11, wherein the SSB-list #n parameter comprises one or more of: a PCI (Physical Cell Identifier) of cell #n; a ssb-subcarrierOffset (SSB Subcarrier Offset) parameter for cell #n that indicates a SSB subcarrier offset with respect to a common resource block boundary of the serving cell; a ssb-PositionsInBurst (SSB Positions In Burst) parameter for cell #n that indicates one or more actual transmitted SSBs in cell #n, wherein the ssb-PositionsInBurst parameter for cell #n comprises one or more of an InOneGroup (In One Group) parameter for cell #n comprising 8 bits that indicate an associated SSB in one group of cell #n and a groupPresence (Group Presence) parameter for cell #n comprising 8 bits that indicate an actual transmitted SSB group for cell #n; a ssb-periodicity (SSB periodicity) parameter for cell #n that indicates a periodicity of SSB bursts in cell #n; or a SSB-index-list (SSB Index List) parameter for cell #n that indicates a list of one or more SSB indexes to be measured in cell #n.

Example 13 is an apparatus configured to be employed in a UE (User Equipment), comprising: a memory interface; and processing circuitry configured to: process RRC (Radio Resource Control) signaling that configures, for each non-serving cell of one or more non-serving cells, an associated Sync-CSI-RS (Synchronization Channel State Information Reference Signal) resource set for that non-serving cell, wherein each associated Sync-CSI-RS resource set comprises NZP (Non-Zero Power)-CSI-RS, and wherein each associated Sync-CSI-RS resource set has the same bandwidth as a SSB (Synchronization Signal Block) of a serving cell; and send, for each non-serving cell of the one or more non-serving cells, an indication of the associated Sync-CSI-RS resource set for that non-serving cell to a memory via the memory interface.

Example 14 comprises the subject matter of any variation of any of example(s) 13, wherein each associated Sync-CSI-RS resource set comprises 8 NZP-CSI-RS resources of that Sync-CSI-RS resource set without CDM (Code Division Multiplexing) occupying 11 physical resource blocks (PRBs).

Example 15 comprises the subject matter of any variation of any of example(s) 14, wherein, for each Sync-CSI-RS resource set, the scrambling IDs for the 8 NZP-CSI-RS resources of that Sync-CSI-RS resource set are the same.

Example 16 comprises the subject matter of any variation of any of example(s) 14, wherein, for each Sync-CSI-RS resource set, the scrambling IDs for the 8 NZP-CSI-RS resources of that Sync-CSI-RS resource set are different.

Example 17 comprises the subject matter of any variation of any of example(s) 14, wherein, for each Sync-CSI-RS resource set, the scrambling IDs for NZP-CSI-RS resources of that Sync-CSI-RS resource set are different for NZP-CSI-RS resources in the same OFDM (Orthogonal Frequency Division Multiplexing) symbol, and wherein the scrambling IDs for NZP-CSI-RS resource of that Sync-CSI-RS resource set are the same for NZP-CSI-RS resources in the same frequency location.

Example 18 comprises the subject matter of any variation of any of example(s) 13, wherein each associated Sync-CSI-RS resource set comprises 4 CDM (Code Division Multiplexing)-based NZP-CSI-RS resources of that Sync-CSI-RS resource set with a single configured AP (Antenna Port) occupying 11 physical resource blocks (PRBs).

Example 19 comprises the subject matter of any variation of any of example(s) 18, wherein, for each Sync-CSI-RS resource set, the scrambling IDs for the 4 CDM-based NZP-CSI-RS resources of that Sync-CSI-RS resource set are the same.

Example 20 comprises the subject matter of any variation of any of example(s) 18, wherein, for each Sync-CSI-RS resource set, the scrambling IDs for the 4 CDM-based NZP-CSI-RS resources of that Sync-CSI-RS resource set are different.

Example 21 comprises the subject matter of any variation of any of example(s) 18, wherein the 4 CDM-based NZP-CSI-RS resources have one of: a common scrambling ID (Identifier) and different CDM values for the single configured AP; or different scrambling IDs and a common CDM value for the single configured AP.

Example 22 comprises the subject matter of any variation of any of example(s) 13-21, wherein the RRC signaling comprises one or more information elements that indicate, for each Sync-CSI-RS resource set, one or more of: a frequency bandwidth of that Sync-CSI-RS resource set as a number of PRBs (Physical Resource Blocks); a starting PRB of that Sync-CSI-RS resource set defined with respect to a starting point of a current active BWP (Bandwidth Part); or an associated cell-defining SSB of that Sync-CSI-RS resource set, that indicates at least one of a physical cell ID (PCI) of the associated cell-defining SSB of that Sync-CSI-RS resource set or a SSB index of the associated cell-defining SSB of that Sync-CSI-RS resource set.

Example 23 is an apparatus configured to be employed in a gNB (next generation Node B), comprising: a memory interface; and processing circuitry configured to: generate RRC (Radio Resource Control) signaling that configures, for each non-serving cell of one or more non-serving cells, an associated Sync-CSI-RS (Synchronization Channel State Information Reference Signal) resource set for that non-serving cell, wherein each associated Sync-CSI-RS resource set comprises NZP (Non-Zero Power)-CSI-RS, and wherein each associated Sync-CSI-RS resource set has the same bandwidth as a SSB (Synchronization Signal Block) of a serving cell; and send, for each non-serving cell of the one or more non-serving cells, an indication of the associated Sync-CSI-RS resource set for that non-serving cell to a memory via the memory interface.

Example 24 comprises the subject matter of any variation of any of example(s) 23, wherein each associated Sync-CSI-RS resource set comprises 8 NZP-CSI-RS resources of that Sync-CSI-RS resource set without CDM (Code Division Multiplexing) occupying 11 physical resource blocks (PRBs).

Example 25 comprises the subject matter of any variation of any of example(s) 24, wherein, for each Sync-CSI-RS resource set, the scrambling IDs for the 8 NZP-CSI-RS resources of that Sync-CSI-RS resource set are the same.

Example 26 comprises the subject matter of any variation of any of example(s) 24, wherein, for each Sync-CSI-RS resource set, the scrambling IDs for the 8 NZP-CSI-RS resources of that Sync-CSI-RS resource set are different.

Example 27 comprises the subject matter of any variation of any of example(s) 24, wherein, for each Sync-CSI-RS resource set, the scrambling IDs for NZP-CSI-RS resources of that Sync-CSI-RS resource set are different for NZP-CSI-RS resources in the same OFDM (Orthogonal Frequency Division Multiplexing) symbol, and wherein the scrambling IDs for NZP-CSI-RS resource of that Sync-CSI-RS resource set are the same for NZP-CSI-RS resources in the same frequency location.

Example 28 comprises the subject matter of any variation of any of example(s), wherein each associated Sync-CSI-RS resource set comprises 4 CDM (Code Division Multiplexing)-based NZP-CSI-RS resources of that Sync-CSI-RS resource set with a single configured AP (Antenna Port) occupying 11 physical resource blocks (PRBs).

Example 29 comprises the subject matter of any variation of any of example(s) 28, wherein the 4 CDM-based NZP-CSI-RS resources have one of: a common scrambling ID (Identifier); a different scrambling ID; the common scrambling ID and different CDM values for the single configured AP; or different scrambling IDs and a common CDM value for the single configured AP.

Example 30 comprises the subject matter of any variation of any of example(s) 23-29, wherein the RRC signaling comprises one or more information elements that indicate, for each Sync-CSI-RS resource set, one or more of: a frequency bandwidth of that Sync-CSI-RS resource set as a number of PRBs (Physical Resource Blocks); a starting PRB of that Sync-CSI-RS resource set defined with respect to a starting point of a current active BWP (Bandwidth Part); or an associated cell-defining SSB of that Sync-CSI-RS resource set, that indicates at least one of a physical cell ID (PCI) of the associated cell-defining SSB of that Sync-CSI-RS resource set or a SSB index of the associated cell-defining SSB of that Sync-CSI-RS resource set.

Example 31 comprises an apparatus comprising means for executing any of the described operations of examples 1-30.

Example 32 comprises a machine readable medium that stores instructions for execution by a processor to perform any of the described operations of examples 1-30.

Example 33 comprises an apparatus comprising: a memory interface; and processing circuitry configured to: perform any of the described operations of examples 1-30.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. An apparatus configured to be employed in a UE (User Equipment), comprising:
a memory interface; and
processing circuitry configured to:
process RRC (Radio Resource Control) signaling comprising a CSI-ResourceConfig (Channel State Information Resource Configuration) IE (Information Element) that comprises a ssb-Resources IE;
determine a list of SSB (Synchronization Signal Block) indexes for L1 (Layer 1) RSRP (Reference Signal Received Power) calculation from the ssb-Resources IE;
determine a SSB burst periodicity and one or more actual transmitted SSBs in a serving cell from SIB1 (System Information Block Type 1) signaling; and
send the list of SSB indexes for L1 RSRP calculation to a memory via the memory interface.

2. The apparatus of claim 1, wherein the ssb-Resources IE comprises a SSB-list #1 parameter that comprises a list of one or more SSB indexes to be measured in the serving cell.

3. The apparatus of claim 2, wherein the ssb-Resources IE comprises a SSB-list #2 parameter that comprises SSB information of cell #2, wherein cell #2 is different than the serving cell.

4. The apparatus of claim 3, wherein the SSB-list #2 parameter comprises one or more of:
a PCI (Physical Cell Identifier) of cell #2;
a ssb-subcarrierOffset (SSB Subcarrier Offset) parameter for cell #2 that indicates a SSB subcarrier offset with respect to a common resource block boundary of the serving cell;
a ssb-PositionsInBurst (SSB Positions In Burst) parameter for cell #2 that indicates one or more actual transmitted SSBs in cell #2, wherein the ssb-PositionsInBurst parameter for cell #2 comprises one or more of an InOneGroup (In One Group) parameter for cell #2 comprising 8 bits that indicate an associated SSB in one group of cell #2 and a groupPresence (Group Presence) parameter for cell #2 comprising 8 bits that indicate an actual transmitted SSB group for cell #2;
a ssb-periodicity (SSB periodicity) parameter for cell #2 that indicates a periodicity of SSB bursts in cell #2; or
a SSB-index-list (SSB Index List) parameter for cell #2 that indicates a list of one or more SSB indexes to be measured in cell #2.

5. The apparatus of claim 3, wherein the ssb-Resources IE comprises a SSB-list #n parameter that comprises SSB information of cell #n, wherein n is an integer greater than 2, and cell #n is different than the serving cell and cell #2.

6. The apparatus of claim 5, wherein the SSB-list #n parameter comprises one or more of:
a PCI (Physical Cell Identifier) of cell #n;
a ssb-subcarrierOffset (SSB Subcarrier Offset) parameter for cell #n that indicates a SSB subcarrier offset with respect to a common resource block boundary of the serving cell;
a ssb-PositionsInBurst (SSB Positions In Burst) parameter for cell #n that indicates one or more actual transmitted SSBs in cell #n, wherein the ssb-PositionsInBurst parameter for cell #n comprises one or more of an InOneGroup (In One Group) parameter for cell #n comprising 8 bits that indicate an associated SSB in one group of cell #n and a groupPresence (Group Presence) parameter for cell #n comprising 8 bits that indicate an actual transmitted SSB group for cell #n;
a ssb-periodicity (SSB periodicity) parameter for cell #n that indicates a periodicity of SSB bursts in cell #n; or
a SSB-index-list (SSB Index List) parameter for cell #n that indicates a list of one or more SSB indexes to be measured in cell #n.

7. An apparatus configured to be employed in a gNB (next generation Node B), comprising:
a memory interface; and
processing circuitry configured to:
generate RRC (Radio Resource Control) signaling comprising a CSI-ResourceConfig (Channel State Information Resource Configuration) IE (Information Element) that comprises a ssb-Resources IE, wherein the ssb-Resources IE comprises a list of SSB (Synchronization Signal Block) indexes for L1 (Layer 1) RSRP (Reference Signal Received Power) calculation;

generate SIB1 (System Information Block Type 1) signaling that indicates a SSB burst periodicity and one or more actual transmitted SSBs in a serving cell; and send the list of SSB indexes for L1 RSRP calculation to a memory via the memory interface.

8. The apparatus of claim 7, wherein the ssb-Resources IE comprises a SSB-list #1 parameter that comprises a list of one or more SSB indexes to be measured in the serving cell.

9. The apparatus of claim 8, wherein the ssb-Resources IE comprises a SSB-list #2 parameter that comprises SSB information of cell #2, wherein cell #2 is different than the serving cell.

10. The apparatus of claim 9, wherein the SSB-list #2 parameter comprises one or more of:
   a PCI (Physical Cell Identifier) of cell #2;
   a ssb-subcarrierOffset (SSB Subcarrier Offset) parameter for cell #2 that indicates a SSB subcarrier offset with respect to a common resource block boundary of the serving cell;
   a ssb-PositionsInBurst (SSB Positions In Burst) parameter for cell #2 that indicates one or more actual transmitted SSBs in cell #2, wherein the ssb-PositionsInBurst parameter for cell #2 comprises one or more of an InOneGroup (In One Group) parameter for cell #2 comprising 8 bits that indicate an associated SSB in one group of cell #2 and a groupPresence (Group Presence) parameter for cell #2 comprising 8 bits that indicate an actual transmitted SSB group for cell #2;
   a ssb-periodicity (SSB periodicity) parameter for cell #2 that indicates a periodicity of SSB bursts in cell #2; or
   a SSB-index-list (SSB Index List) parameter for cell #2 that indicates a list of one or more SSB indexes to be measured in cell #2.

11. The apparatus of claim 9, wherein the ssb-Resources IE comprises a SSB-list #n parameter that comprises SSB information of cell #n, wherein n is an integer greater than 2, and cell #n is different than the serving cell and cell #2.

12. The apparatus of claim 11, wherein the SSB-list #n parameter comprises one or more of:
   a PCI (Physical Cell Identifier) of cell #n;
   a ssb-subcarrierOffset (SSB Subcarrier Offset) parameter for cell #n that indicates a SSB subcarrier offset with respect to a common resource block boundary of the serving cell;
   a ssb-PositionsInBurst (SSB Positions In Burst) parameter for cell #n that indicates one or more actual transmitted SSBs in cell #n, wherein the ssb-PositionsInBurst parameter for cell #n comprises one or more of an InOneGroup (In One Group) parameter for cell #n comprising 8 bits that indicate an associated SSB in one group of cell #n and a groupPresence (Group Presence) parameter for cell #n comprising 8 bits that indicate an actual transmitted SSB group for cell #n;
   a ssb-periodicity (SSB periodicity) parameter for cell #n that indicates a periodicity of SSB bursts in cell #n; or
   a SSB-index-list (SSB Index List) parameter for cell #n that indicates a list of one or more SSB indexes to be measured in cell #n.

* * * * *